United States Patent
Barany et al.

(10) Patent No.: US 11,490,050 B2
(45) Date of Patent: Nov. 1, 2022

(54) ENTRY ADAPTER FOR A CABLE TELEVISION NETWORK

(71) Applicant: PPC BROADBAND, INC., East Syracuse, NY (US)

(72) Inventors: David A. Barany, Syracuse, NY (US); Ryan Hagan, Marcy, NY (US); Paul Bailey, Camillus, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 442 days.

(21) Appl. No.: 16/248,462

(22) Filed: Jan. 15, 2019

(65) Prior Publication Data

US 2019/0222801 A1 Jul. 18, 2019

Related U.S. Application Data

(60) Provisional application No. 62/617,838, filed on Jan. 16, 2018.

(51) Int. Cl.
| | |
|---|---|
| *H04N 7/10* | (2006.01) |
| *H04N 5/44* | (2011.01) |
| *H04N 21/61* | (2011.01) |
| *H04L 12/28* | (2006.01) |

(52) U.S. Cl.
CPC ......... *H04N 7/104* (2013.01); *H04L 12/2801* (2013.01); *H04L 12/2898* (2013.01); *H04N 5/44* (2013.01); *H04N 7/106* (2013.01); *H04N 21/6118* (2013.01); *H04N 21/6168* (2013.01)

(58) Field of Classification Search
None
See application file for complete search history.

(56) References Cited

U.S. PATENT DOCUMENTS

| | | | | | |
|---|---|---|---|---|---|
| 5,815,794 | A | * | 9/1998 | Williams | ............ H04L 12/2801 |
| | | | | | 348/E7.07 |
| 6,622,304 | B1 | * | 9/2003 | Carhart | ............... H04L 12/2803 |
| | | | | | 348/E7.05 |
| 6,978,474 | B1 | * | 12/2005 | Sheppard | ............ H04L 12/2801 |
| | | | | | 348/E7.05 |
| 8,094,640 | B2 | * | 1/2012 | Robertson | ............... H04L 5/143 |
| | | | | | 370/329 |

(Continued)

OTHER PUBLICATIONS

Shane Thomas (Authorized Officer), International Search Report and Written Opinion dated Mar. 27, 2019, PCT Application No. PCT/US2019/013684, pp. 1-10.

*Primary Examiner* — An Son P Huynh
(74) *Attorney, Agent, or Firm* — MH2 Technology Law Group LLP (57) ABSTRACT

An entry adapter configured to communicate cable television (CATV) signals from a CATV network to one or more network devices and to communicate Multi-Media over Coaxial Alliance (MoCA) signals with a MoCA server, the entry adapter including one or more MoCA ports, and a signal combination device configured to direct the CATV signals toward one or more access ports without substantial attenuation, to substantially attenuate the CATV signals directed toward the one or more MoCA ports, to pass the MoCA signals from the one or more MoCA ports to the one or more access ports, and to pass the MoCA signals from the one or more access ports to the one or more MoCA ports.

35 Claims, 7 Drawing Sheets

(56) References Cited

U.S. PATENT DOCUMENTS

| | | | | |
|---|---|---|---|---|
| 8,174,999 B2 * | 5/2012 | Kliger | | H04L 12/2803 370/252 |
| 8,345,553 B2 * | 1/2013 | Ohana | | H04L 12/2801 370/235 |
| 8,724,485 B2 * | 5/2014 | Kliger | | H04L 12/2803 370/252 |
| 9,351,051 B2 * | 5/2016 | Wells | | H04N 21/63 |
| 10,142,677 B2 * | 11/2018 | Wells | | H04N 21/63 |
| 2003/0151695 A1 * | 8/2003 | Sahlin | | H04L 12/2801 348/705 |
| 2008/0030505 A1 * | 2/2008 | Keuenhof | | H04N 7/183 345/501 |
| 2009/0077608 A1 * | 3/2009 | Romerein | | H03H 7/463 725/127 |
| 2010/0031303 A1 * | 2/2010 | Yu | | H04L 12/2801 725/116 |
| 2010/0100918 A1 * | 4/2010 | Egan, Jr. | | H04N 7/102 725/111 |
| 2010/0125877 A1 * | 5/2010 | Wells | | H04L 12/2801 725/78 |
| 2010/0146564 A1 * | 6/2010 | Halik | | H04L 12/2801 725/78 |
| 2011/0080517 A1 * | 4/2011 | Zhou | | H04L 27/0014 348/433.1 |
| 2012/0054805 A1 * | 3/2012 | Shafer | | H04L 12/2801 725/78 |
| 2013/0002958 A1 * | 1/2013 | Labro | | H04N 7/104 348/584 |
| 2013/0133012 A1 * | 5/2013 | Ling | | H04N 7/106 725/68 |
| 2013/0156115 A1 * | 6/2013 | Petrovic | | H04N 7/104 375/257 |
| 2013/0287042 A1 * | 10/2013 | Kliger | | H04L 12/2838 370/464 |
| 2014/0362298 A1 * | 12/2014 | Malhotra | | H04N 5/63 348/730 |
| 2015/0207525 A1 * | 7/2015 | Li | | H04N 21/6118 370/297 |
| 2015/0304732 A1 * | 10/2015 | Shapson | | H04L 12/2838 725/149 |
| 2016/0205435 A1 * | 7/2016 | Stafford | | H04N 21/4436 725/127 |
| 2017/0126536 A1 * | 5/2017 | Kumar | | H04L 12/2801 |
| 2017/0126539 A1 * | 5/2017 | Tiwari | | H04L 12/2801 |
| 2017/0149645 A1 * | 5/2017 | Kumar | | H04L 43/50 |
| 2018/0007313 A1 | 1/2018 | Bailey et al. | | |
| 2018/0007318 A1 | 1/2018 | Bailey et al. | | |
| 2018/0288491 A1 * | 10/2018 | Shapson | | H04N 21/6168 |

* cited by examiner

ENTRY ADAPTER FOR A CABLE TELEVISION NETWORK

FIELD

The present disclosure relates to cable television (CATV) networks, and more particularly to a CATV network interface device which interconnects subscriber equipment at a subscriber's premises to the CATV network infrastructure.

BACKGROUND

CATV networks use an infrastructure of interconnected coaxial cables, signal splitters and combiners, repeating amplifiers, filters, trunk lines, cable taps, drop lines and other signal-conducting devices to supply and distribute high frequency "downstream" signals from a main signal distribution facility, known as a "headend," to the premises (e.g., homes and offices) of CATV subscribers. The downstream signals operate the subscriber equipment, such as television sets, telephone sets, and computers. In addition, most CATV networks also transmit "upstream" signals from the subscriber equipment back to the headend of the CATV network. For example, the subscriber uses a set top box to select programs for display on the television set. As another example, two-way communication is essential when using a personal computer connected through the CATV infrastructure to the public Internet. As a further example, voice over Internet protocol (VOIP) telephone sets use the CATV infrastructure and the public Internet as part of the communication medium for two-way telephone conversations.

To permit simultaneous communication of upstream and downstream CATV signals, and to permit interoperability of the subscriber equipment and the equipment associated with the CATV network infrastructure outside of subscriber premises, the downstream and upstream signals are confined to two different frequency bands. For example, in some CATV networks the downstream frequency band can be within the range of 54-1002 megahertz (MHz) and the upstream frequency band can be within the range of 5-42 MHz.

The downstream signals are delivered from the CATV network infrastructure to the subscriber premises at a CATV entry adapter, which is also commonly referred to as an entry device, terminal adapter, or a drop amplifier. The entry adapter is a multi-port device which connects at an entry port to a CATV drop cable from the CATV network infrastructure and which connects at a multiplicity of other distribution ports to coaxial cables which extend throughout the subscriber premises to cable outlets. Each cable outlet is available to be connected to subscriber equipment. Typically, most homes have coaxial cables extending to cable outlets in almost every room, because different types of subscriber equipment may be used in different rooms. For example, television sets, computers, and telephone sets are commonly used in many different rooms of a home or office. The multiple distribution ports of the entry adapter deliver the downstream signals to each cable outlet and conduct the upstream signals from the subscriber equipment through the entry adapter to the drop cable of the CATV infrastructure.

In addition to television sets, computers and telephones, a relatively large number of other entertainment and multimedia devices are available for use in homes. For example, a digital video recorder (DVR) is used to record broadcast programming, still photography and moving pictures in a memory medium so that the content can be replayed on a display or television set at a later time selected by the user. As another example, computer games are also played at displays or on television sets. Such computer games may be those obtained over the Internet from the CATV network or from media played on play-back devices connected to displays or television sets. As a further example, signals from a receiver of satellite-broadcast signals may be distributed for viewing or listening throughout the home. These types of devices, including the more-conventional television sets, telephone sets, and devices connected to the Internet by the CATV network are generically referred to as multimedia devices.

The desire to use multimedia devices at multiple different locations within the home or subscriber premises has led to the creation of the Multimedia over Coax Alliance (MoCA). MoCA has developed specifications for products to create an in-home entertainment network for interconnecting presently-known and future multimedia devices. A MoCA in-home network uses the subscriber premise or in-home coaxial cable infrastructure originally established for distribution of CATV signals within the subscriber premises, principally because that coaxial cable infrastructure already exists in most homes and is capable of carrying much more information than is carried in the CATV frequency bands. A MoCA network is established by connecting MoCA-enabled or MoCA interface devices at the cable outlets in the rooms of the subscriber premises. These MoCA interface devices implement a MoCA communication protocol which encapsulates the signals normally used by the multimedia devices within MoCA signal packets and then communicates the MoCA signal packets between other MoCA interface devices connected at other cable outlets. The receiving MoCA interface device removes the encapsulated multimedia signals from the MoCA signal packets, and delivers the multimedia signals to the connected display, computer, or other multimedia device from which the content is presented to the user.

Each MoCA-enabled device is capable of communicating with every other MoCA-enabled device in the in-home or subscriber premises MoCA network to deliver the multimedia content throughout the home or subscriber premises. The multimedia content that is available from one multimedia device can be displayed, played, or otherwise used on a different MoCA enabled device at a different location within the home, thereby avoiding physically relocating the originating multimedia device from one location to another within the subscriber premises. The communication of multimedia content over the MoCA network is considered beneficial in more fully utilizing the multimedia devices present in modern homes.

Since the MoCA network may function simultaneously with the normal operation of the CATV services, the MoCA signals communicated between MoCA interface devices utilize a frequency range of 1125-1675 MHz, which is outside of the frequency band of CATV signals. This so-called D band of MoCA signals is divided into eight different frequency ranges, 01-08, and these eight different D frequency ranges are used to assure communication between the selected MoCA interface devices. For example, the D-1 band at 1125-1175 MHz may be used to communicate CATV television programming content between a MoCA interface device connected to a set-top box in a main room of the house and another MoCA interface device connected to a television set in bedroom of the house, while a MoCA interface device connected to a computer gaming multimedia device in a basement room of the house simultaneously communicates computer game content over the 06 band at 1375-1425 MHz to a computer located in a recreation room of the house. The MoCA frequency band also includes other frequency ranges outside of the CATV frequency band, but the D band is used to establish connections and communicate content between the MoCA interface devices.

Using the in-home coaxial cable as the principal communication medium substantially simplifies the implementation of the MoCA network, but there are certain disadvantages in doing so. The D band MoCA frequencies have the capability of passing through the CATV entry adapter and entering the CATV network where they may then enter a nearby subscriber's premises. The presence of the MoCA signals at the nearby subscriber's premises compromises the privacy and security of the information originally intended to be confined within the original subscriber premises. The MoCA signals from the original subscriber premises which enter through the CATV network to the nearby subscriber premises also have the potential to adversely affect the performance of a MoCA network in nearby subscriber's premises. The conflict of the MoCA signals from the original and nearby subscriber premises may cause the MoCA interface devices to malfunction or not operate properly on a consistent basis.

Another undesirable aspect of using a MoCA for communication between the various multimedia devices is that a relatively large MoCA network with many cable outlet ports has the effect of deteriorating the strength of the downstream CATV signal. Because in-home multimedia devices frequently require access to the CATV network in order to send upstream CATV signals as well is to receive downstream CATV signals, the in-home coaxial cable infrastructure must commonly connect all of the CATV cables and CATV ports within the home to a common connection with the drop cable that supplies the CATV signal and services to the home. The common connection is usually achieved in the CATV entry adapter, which provides output ports that connect to the coaxial cables extending within the home to each separate location or room. A splitter within the CATV entry adapter divides the CATV downstream signals into two or more reduced-power copies of the input signal, and supplies each copy to a separate outlet port. Similarly, upstream signals from the subscriber equipment connected to each of the coaxial cables are combined in the splitter and then passed upstream through the CATV entry adapter into the CATV network.

The typical splitter is passive, which means that the power of the input signal is divided among the copies of the output signals split from the input signal. Each copy of the signal therefore has diminished power or strength, and the lower strength copies will not have the same quality as the input signal. In general terms, the quality is the strength of the signal relative to the strength of the inherent ambient noise. Since the inherent ambient noise generally cannot be diminished and is usually a constant, lowering the strength of the signal relative to the noise reduces the signal-to-noise ratio. The signal-to-noise ratio is a recognized measure of the quality of a signal. A lower signal-to-noise ratio represents a lesser quality signal.

Because many homes require a relatively large number of cable outlet ports, for example six or more, the downstream CATV signal must be split into a comparable relatively large number of copies. The greater number of signal splitters required to generate the requisite number of separate copies of the downstream CATV signal diminishes the strength of the downstream signal copies. The quality of CATV service available in an in-home network with a relatively large number of cable output ports therefore suffers, because the strength of the CATV signal available at each of these ports is substantially diminished due to the extent of signal splitting required.

On the other hand, upstream CATV signals from the subscriber equipment do not occur as frequently as downstream CATV signals. Furthermore, upstream signals are generally of a higher power because they are generated immediately by the subscriber equipment within the home. Consequently, the reduction in CATV signal strength applies principally to downstream CATV signals, which of course provide the multimedia content to the subscriber. It is the quality of the multimedia content observed by the subscriber that forms the basis for the subscriber's opinion of quality of service.

To compensate for downstream CATV signal strength reduction caused by splitting, some entry adapters include amplifiers to increase the strength of the copies of the downstream CATV signals. Of course, including an amplifier along with the signal splitter makes the signal transmission dependent upon the presence of adequate electrical power to operate the amplifier. The power for the amplifier is derived from commercial sources within the household. If the commercial power supply is temporarily interrupted, or if the power supply equipment within the home ceases operating properly, the customer perceives a CATV problem and reports the problem to the CATV service provider. The CATV service provider must thereafter send a service or repair person to the home of the subscriber in order to identify and remedy the problem. Such service calls are a significant expense for a CATV service provider. CATV service providers therefore attempt to eliminate as many of the potential points of failure as possible in the equipment supplied by the CATV service provider, to reduce service calls and repair costs. Including an amplifier in a CATV entry adapter creates a potential point of failure, and for that reason most CATV service providers wish to avoid using CATV entry adapters with amplifiers. However, in those relatively large in-home networks with multiple outlets for connecting multiple multimedia devices, there has been little previous choice but to use amplifiers in conjunction with splitters in order to obtain the desired downstream CATV signal strength that represents a high quality of service.

SUMMARY

Embodiments of the disclosure provide an entry adapter for receiving cable-television (CATV) signals from a CATV network, providing the CATV signals to one or more network devices and a Multi-Media over Coaxial Alliance (MoCA) server, and communicating MoCA signals between the MoCA server and one or more MoCA devices. The entry adapter includes an input port configured to be connected to the CATV network, a MoCA-blocking filter electrically connected to the input port and configured to block MoCA signals from transmitting to the input port, a signal combination device in electrical communication with the input port via the MoCA-blocking filter. The signal combination device includes a first splitter having a first leg terminal electrically connected to the MoCA-blocking filter, a second leg terminal, and a common terminal. The first splitter is configured to attenuate signals passing between the first and second leg terminals by at least about 40 decibels, and the first splitter is configured to combine downstream CATV signals received at the first leg terminal with MoCA signals received at the second leg terminal, and provide a broadband signal to the common terminal. The entry adapter further includes a second splitter having a common terminal electrically connected to the common terminal of the first splitter, a first leg terminal, and a second leg terminal. The second splitter is configured to provide copies of the broadband signal received at the common terminal thereof to the first and second leg terminals thereof. The entry adapter also includes a MoCA-pas sing filter electrically connected to the second leg terminal of the first splitter. The MoCA-passing filter is configured to block CATV signals from proceeding therethrough. The entry adapter further includes a first access port electrically connected the first leg terminal of the second splitter, and configured to be connected to the MoCA server, a second access port electrically connected to the second leg terminal of the second splitter, and configured to be connected to the one or more network devices, a plurality of MoCA ports configured to be connected to the one or more MoCA devices, and a MoCA splitter having a common terminal electrically connected to the MoCA-passing filter and a plurality of leg terminals, wherein the MoCA ports are electrically connected to the plurality of leg terminals. The MoCA splitter is configured to communicate MoCA signals between the plurality of MoCA ports without substantially attenuating the MoCA signals, to communicate MoCA signals from the plurality of leg terminals to MoCA-pas sing filter, and from the MoCA-passing filter to the plurality of leg terminals. The MoCA-blocking filter is configured to reflect the MoCA signals towards the MoCA server so as to reduce attenuation in the MoCA signals that proceed from one of the plurality of MoCA ports to the first access port.

Embodiments of the disclosure also provide an entry adapter for a cable television (CATV) network. The entry adapter includes an input port configured to receive downstream CATV signals from the CATV network and to communicate upstream CATV signals to the CATV network, a signal combination device having a first leg terminal configured to receive the downstream CATV signals from the input port, a second leg terminal, and a common terminal. The signal combination device is configured to attenuate signals passing between the first and second leg terminals. The entry adapter also includes a first access port configured to receive the downstream CATV signals from the common terminal of the signal combination device, to communicate upstream CATV signals to the common terminal, and to communicate Multi-Media over Coaxial Alliance (MoCA) signals to the common terminal, and a MoCA-pas sing filter electrically connected to the second leg terminal of the signal combination device. The MoCA-passing filter is configured to block CATV signals from passing therethrough, and to allow MoCA signals to pass substantially unattenuated therethrough. The entry adapter also includes one or more MoCA ports electrically connected to the MoCA-pas sing filter, the one or more MoCA ports being configured to send MoCA signals to the first access port via the MoCA-passing filter and the signal combination device, and to receive MoCA signal from the first access port via the signal combination device and the MoCA-passing filter.

Embodiments of the disclosure further provide an entry adapter including an input port configured to communicate cable television (CATV) signals with a CATV network, one or more access ports configured to communicate the CATV signals to one or more network devices and to communicate Multi-Media over Coaxial Alliance (MoCA) signals with a MoCA server, one or more MoCA ports configured to communicate the MoCA signals with a MoCA device, and a signal combination device in electrical communication with the input port, the one or more access ports, and the one or more MoCA ports configured to receive the CATV signals from the input port, to direct the CATV signals toward the one or more access ports without substantial attenuation, to substantially attenuate the CATV signals directed toward the one or more MoCA ports, to pass the MoCA signals from the one or more MoCA ports to the one or more access ports, and to pass the MoCA signals from the one or more access ports to the one or more MoCA ports.

DETAILED DESCRIPTION

Homes are one of the largest contributors of broadband noise to CATV networks. Select cable operators deliver the CATV signals to a home server (DVR) which in turn distributes video/data streams to client boxes via MoCA frequencies. As the MoCA signals are higher in frequency than the standard network signals, both can co-exist on the same cables. However the MoCA-enabled equipment typically have no need for the CATV signals as they get their information via MoCA. Therefore, the standard CATV signals can be blocked from reaching the MoCA-enabled equipment without disrupting service to them. The cable runs from the distribution point can be fairly long and can run through a home. Imperfections in these cable runs will allow the cable to pick up any electronic noise that may exist such as RF emissions from local radio and TV sources, motor and switch noise or any other emissions from any other RF source in the home. This home generated electronic noise is then normally injected into the cable network which can then interfere with the normal operation of the network.

In accordance with aspects of the present disclosure, RF noise that is in the spectrum of the normal cable network signals is filtered out via a high-pass (e.g., MoCA-only) filter to improve the quality of the cable network. Implementations consistent with the present disclosure provide an entry adapter (e.g., a CATV entry adapter) including a MoCA filter that allows MoCA signals/traffic to pass to/from input to output(s), but blocks non-MoCA frequencies (e.g., standard CATV signal frequencies). The MoCA filter prevents or at least attenuates broadband noise/ingress that is on any drop line connected to the MoCA-only splitter output from entering the CATV network and interfering/corrupting the signals on the CATV network.

Figure 1:
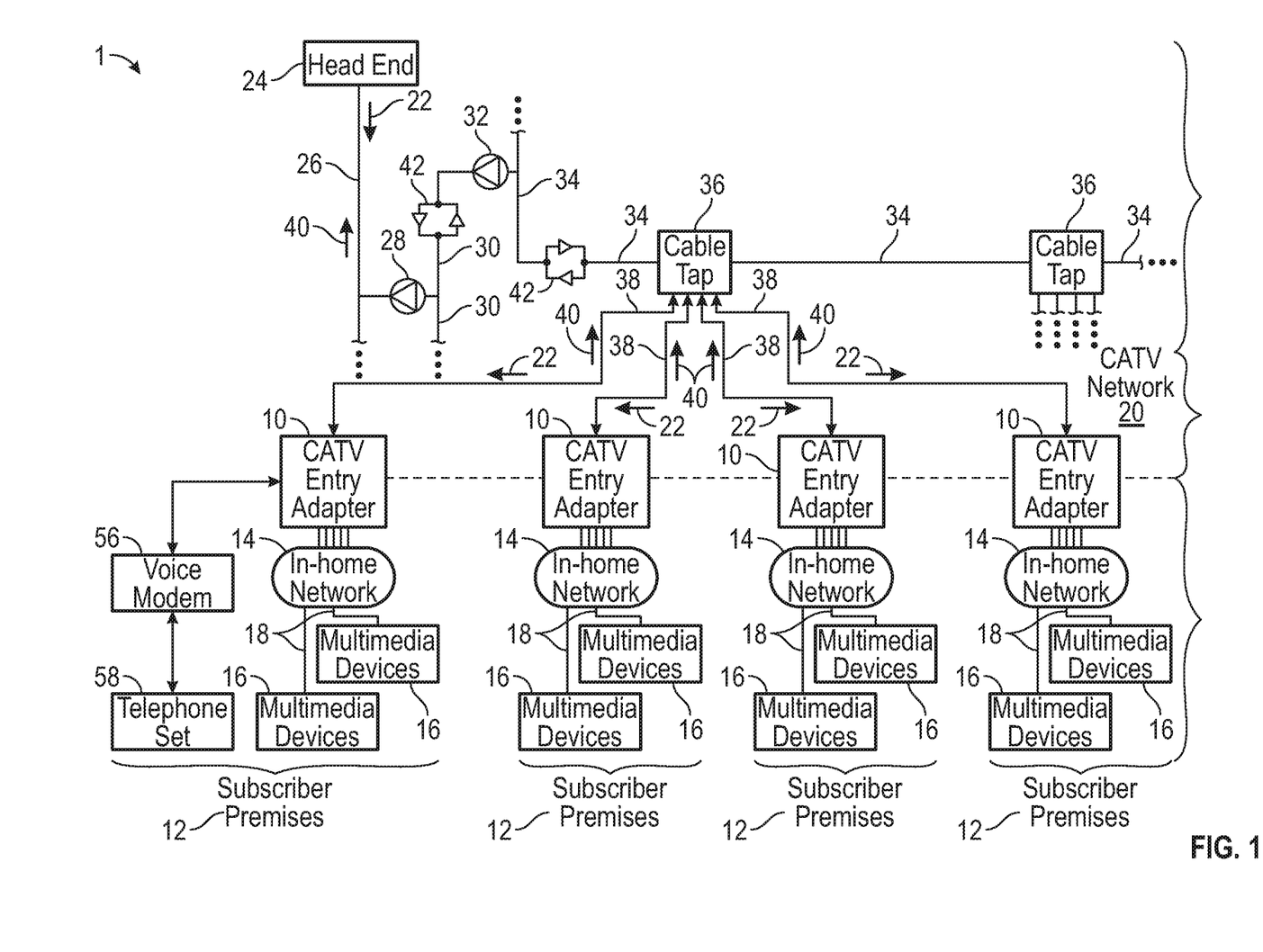
FIG. 1 shows an example environment, in accordance with aspects of the present disclosure.

FIG. 1 shows an example environment 1, in accordance with aspects of the present disclosure. The environment 1 can include a CATV network 20 and one or more subscriber premises 12 communicatively linked to the CATV network by respective CATV entry adapters 10. Downstream signals 22 originate from programming sources at a headend 24 of the CATV network 20, and can be conducted to the entry adapters 10 in a sequential path through a main trunk cable 26, a signal splitter/combiner 28, secondary trunk cables 30, another signal splitter/combiner 32, distribution cable branches 34, cable taps 36, and drop cables 38. Upstream signals 40 originating from the subscriber equipment 16, 56, and 58 can be delivered from the entry adapters 10 to the CATV network 20, and can be conducted to the headend 24 in the same path but in reverse sequence. Interspersed at appropriate locations within the topology of the CATV network 20 are repeater amplifiers 42, which amplify both the downstream CATV signals 22 and the upstream signals 40. Repeater amplifiers may also be included in the cable taps 36. The cable taps 36 and signal splitter/combiners 28, 32 divide a single downstream signal into multiple separate downstream signals, and combine multiple upstream signals into a single upstream signal.

An entry adapter 10 can be one or more devices located at a particular subscriber premises 12 and can form a part of a conventional in-home network 14, such as a MoCA in-home entertainment network, at the subscriber premises 12. The in-home network 14 interconnects subscriber equipment or multimedia devices 16 within the subscriber premises 12, and allows the multimedia devices 16 to communicate multimedia content or in-home signals between other multimedia devices 16 within the in-home network 14. The connection medium of the in-home network 14 can be formed in significant part by a preexisting CATV coaxial cable infrastructure (represented generally by coaxial cables 18) present in the subscriber premises 12 and originally intended to communicate CATV signals between the multimedia or subscriber devices 16. However, the connection medium of the in-home network 14 may be intentionally created using newly-installed coaxial cables 18. Examples of multimedia devices 16 are digital video recorders, computers, data modems, computer game playing devices, television sets, television set-top boxes, and other audio and visual entertainment devices.

The entry adapter 10 is also a part of a CATV network 20. The entry adapter 10 delivers CATV multimedia content or signals from the CATV network 20 to subscriber equipment at the subscriber premises 12. The subscriber equipment includes the multimedia devices 16, but may also include other devices which may or may not operate as a part of the in-home network 14 but which are intended to function as a result of connection to the CATV network 20. Examples of subscriber equipment which may not be part of the in-home network 14 are a modem 56 and a connected voice over Internet protocol (VoIP) telephone set 58 and certain other embedded multimedia terminal adapter-(eMTA) compatible devices (not shown).

The entry adapter 10 has characteristics that allow it to function simultaneously in both the in-home network 14 and in the CATV network 20, thereby benefiting both the in-home network 14 and the CATV network 20. The entry adapter 10 can function as a hub in the in-home network 14, to effectively transfer in-home network signals between the multimedia and subscriber devices 16. The entry adapter 10 also functions as an interface between the CATV network 20 and the subscriber equipment 16 located at the subscriber premises 12, thereby providing CATV service to the subscriber. In addition, the entry adapter 10 securely confines in-home network communications within each subscriber premises and prevents the network signals from entering the CATV network 20 and degrading the strength of the CATV signals conducted by the CATV network 20 for possible recognition by a nearby subscriber.

Figure 2:
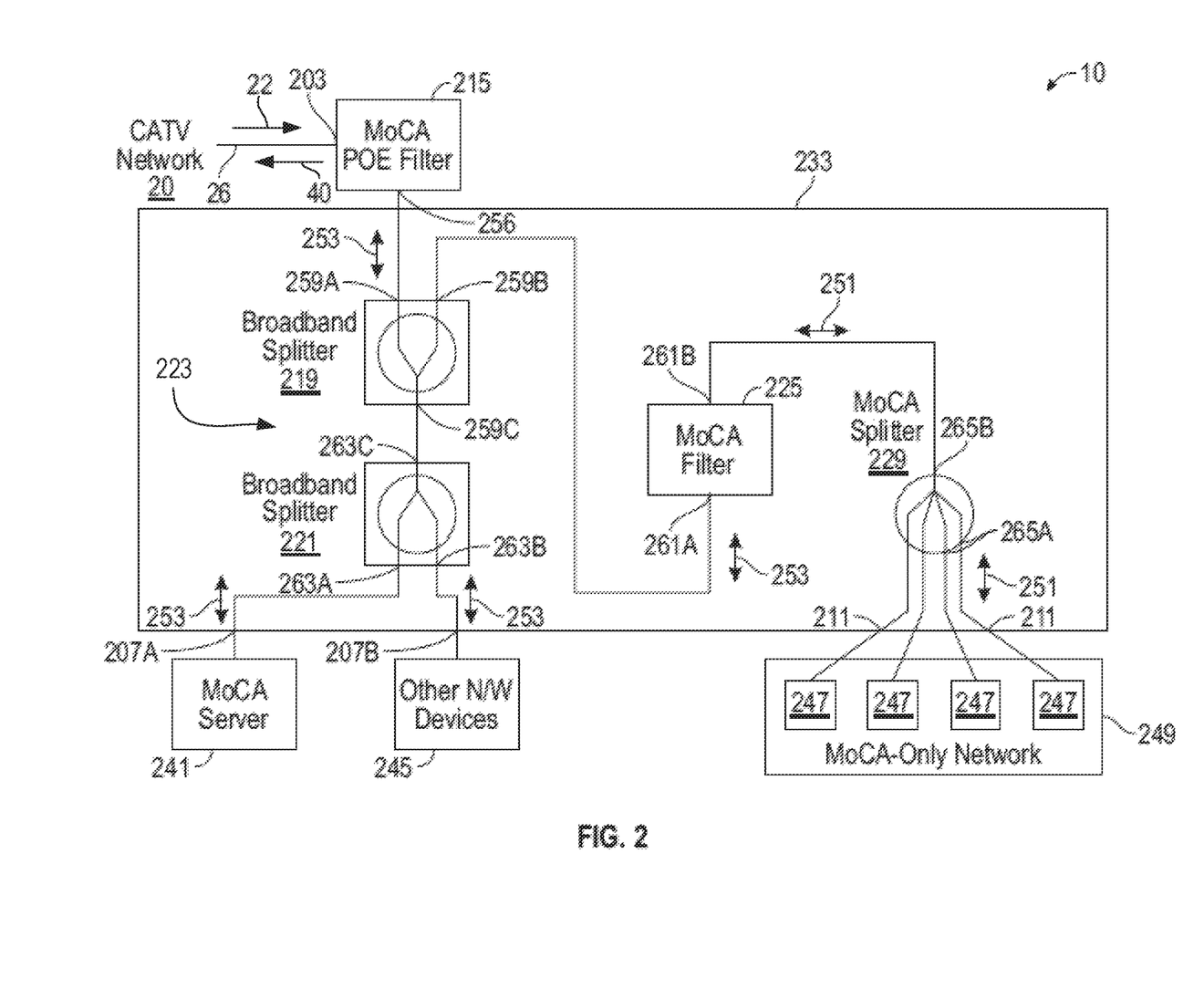
FIG. 2 shows a functional block diagram illustrating an example of an entry adapter, in accordance with aspects of the present disclosure.

FIG. 2 shows a functional block diagram, illustrating an example of an entry adapter 10, in accordance with aspects of the present disclosure. The entry adapter 10 includes an input port 203, a first access port 207A, a second access sport 207B, and one or more MoCA ports 211. The access ports 207A, 207B may each be representative of one or more ports. Additionally, the entry adapter 10 includes a MoCA-blocking, point-of-entry (POE) filter 215, a signal combination device 223, a MoCA-passing filter 225, and a MoCA splitter 229.

The signal combination device 223 may be configured to combine, separate, attenuate, direct, or otherwise control the signals 22, 40, and/or 251 transmitted through the entry adapter 10. For example, the signal combination device 223 may include one or more splitters, directional couplers, or the like. In the specific, illustrated embodiment, the signal combination device 223 includes first and second broadband splitters 219, 221. Although two splitters 219, 221 are shown, it will be appreciated that any number of splitters may be employed. In some embodiments, either or both of the splitters 219, 221 may individually or cooperatively control, direct, block, pass, attenuate, or otherwise regulate signal transmission between the various ports 203, 207A, 207B, and 211, as will be described in greater detail below.

Further, the input port 203, access ports 207A, 207B, and MoCA ports 211 can be mounted to a housing 233 that houses the MoCA POE filter 215, the broadband splitter 219, the broadband splitter 221, the MoCA-passing filter 225, and the MoCA splitter 229. The housing 233 may be a polymer, metal, or the like, and may be formed from a single piece, or assembled from several different pieces.

The entry adapter 10 can be communicatively connected to, for example, the CATV network 20 (shown in FIG. 1) via the input port 203. A downstream CATV signal 22 originating from, for example, programming sources at a headend of the CATV network 20 can be conducted to the entry adapter 10 through the input port 203 via the drop cable 26. The entry adapter 10 can provide the downstream signal 30 to subscriber equipment, such as MoCA server 241 or other network (N/W) devices 245 (e.g., VOIP telephones, television sets, and/or data modems) via the access ports 207A, 207B, respectively. In the reverse direction, the MoCA server 241 or other network (N/W) devices 245 can communicate with the CATV network 20 via the entry adapter 10 by conducting the upstream CATV signal 40 from the access ports 207A, 207B to the input port 203. Additionally, the entry adapter 10 can be communicatively connected to MoCA-enabled subscriber equipment 247 (e.g., multimedia devices 16) of a MoCA-only network 249 (which provide part or all of in-home network 14) via the MoCA ports 211. MoCA signals 251 originating from the MoCA server 241 or the other subscriber equipment 245 can be conducted bidirectionally through the entry adapter 10 via the first access port 207A, the second access port 207B, or both, to the MoCA ports 211 via the signal combination device (e.g., the splitters 219, 221), the MoCA-passing filter 225, and the MoCA splitter 229.

In accordance with aspects of the present disclosure, the entry adapter 10, and more particularly, in some embodiments, the signal combination device 223, combines the downstream CATV signal 22, the upstream CATV signal 40, and the MoCA signals 251 between the MoCA-blocking POE filter 215, the access ports 207A, 207B, and the MoCA-passing filter 225. The combined signal is referred to herein as broadband signal 253. The downstream CATV signal 22 can have a frequency range between about 50 MHz and about 1100 MHz. In some implementations, the downstream CATV signal 22 can have a frequency range between about 54 and about 1002 MHz. The upstream signal can have a frequency range between about 0 and about 50 MHz. In some implementations, the upstream signal can have a frequency range between about 5 MHz and about 42 MHz. The MoCA signal can have a frequency range between about 1100 MHz and about 1700 MHz. In some implementations, the MoCA signal can have a frequency range between about 1175 MHz and about 1675 MHz. The broadband signal 253 can have a frequency range between about 0 and 1700 MHz. In some implementations, the broadband signal 253 can have a frequency range between about 5 MHz and 1675 MHz.

In a specific embodiment, the MoCA-blocking, POE filter 215 can have a first terminal, which may be or be electrically connected (e.g., directly) to and in communication with the entry port 203, and a second terminal 256 electrically connected (e.g., directly) to and in communication with a first leg terminal 259A of the broadband splitter 219. A common terminal 259C of the broadband splitter 219 can be connected (e.g., directly) to and in communication with a common terminal 263C of the broadband splitter 221. A first leg terminal 263A of the broadband splitter 221 can be connected to and in communication with the MoCA server 241 through the first access port 207A of the entry adapter 10. A second leg terminal 263B of the broadband splitter 221 can be connected to and in communication with one or more network devices 245 through the second access port(s) 207B of the entry adapter 10.

Accordingly, the downstream CATV signal 22 and the upstream CATV signal 40 can be communicated between the input port 203 and the access ports 207A, 207B via the MoCA-blocking POE filter 215, the first splitter 219, and the second splitter 221. In implementations, the splitters 219 and 221 can be configured to pass signals in the frequency range of the broadband signal 253, including frequencies of the downstream CATV signal 22, the upstream CATV signal 40, and the MoCA signals 251, so as to minimize attenuation of the broadband signal 253 in comparison to frequencies outside those of the broadband signal 251. In some embodiments, the level of attenuation may change depending on the direction of the signal, as will be described in greater detail below. The MoCA-blocking POE filter 215 can be configured to pass frequencies encompassing those of the downstream CATV signal 22 and the upstream CATV signal 20, and to block frequencies of the MoCA signals 251, e.g., based on frequency. Accordingly, the entire frequency band of the broadband signal 253, including the frequency band of the MoCA signal 251, can be communicated through the access ports 207A, 207B. However, the frequency band of the MoCA signal 251 is blocked from the input port 203, while the frequencies encompassing those of the downstream CATV signal 22 and the upstream CATV signal 20 are permitted to pass through the input port 203.

The MoCA-blocking POE filter 215 may be configured to reflect the MoCA signals 251 that are blocked from reaching the input port 203. For example, the MoCA-blocking POE filter 215 may not terminate these signals to ground, but may allow them to "bounce" back through the signal combination device (e.g., the splitters 219, 221), toward the access ports 207A, 207B. The reflected MoCA signals may then add to the strength of the MoCA signals 251 received at the access ports 207A, 207B, thereby enhancing reception by the server 241 and/or the other network devices 245. As such, there may be an increased signal strength for MoCA signals 251 passed between the access ports 207A, 207B in comparison to other frequency bands, as will be apparent in Table 1 below.

Further, the MoCA-blocking POE filter 215 can be either internal to the housing 233 or external thereto, e.g., external to the remainder of the entry device 10. Positioning the MoCA-blocking POE filter 215 external to the housing 233 may facilitate changing the cable system frequency split, e.g., allowing the cable operator to increase the frequency spectrum of downstream and/or upstream signals. Thus, for example, as the cable operator changes the frequency plan from 5-1002 MHz combined up/downstream to 5-1218 MHz combined up/downstream, the MoCA-blocking POE filter 215 can remain in-place without the need for replacement.

Referring back to the first splitter 219, a second leg terminal 259B of the first splitter 219 can be electrically connected (e.g., directly) to and in communication with a first terminal 261A of the MoCA-passing filter 225. The second terminal 261B of the MoCA-passing filter 225 can be electrically connected to and in communication with the MoCA-enabled subscriber equipment 247 via the MoCA splitter 229 and the MoCA ports 211. More specifically, the second terminal 261B of the MoCA-passing filter 225 can be in direct communication with a common port 265A of the MoCA splitter 229. The leg terminals 265B of the MoCA splitter 229 can be in direct communication with the MoCA ports 211, which communicatively connect to the MoCA-enabled subscriber equipment 247.

The second leg terminal 259B of the first splitter 219 communicates the broadband signal 253 to the first terminal 261A of the MoCA-passing filter 225. The MoCA-passing filter 225 is configured to block frequencies outside those of the MoCA signals 251. In some implementations, the MoCA-passing filter 225 is a high-pass filter that blocks all frequencies below about 1100 MHZ. In some implementations, the MoCA-passing filter 225 blocks all frequencies below about 1175 MHZ. In some implementations, the MoCA-pas sing filter 225 is a band-pass filter that blocks all frequencies outside a range of about 1100 MHz to about 1700 MHz. In some implementations, the MoCA-pas sing filter 225 blocks all frequencies outside a range of about 1175 MHz to about 1675 MHz.

The primary purpose of MoCA-passing filter 225 is to attenuate ingress noise present at ports 211 from entering the cable network. As virtually all ingress noise is below 1000 MHz, MoCA filter 225 does a good job of protecting the cable plant from any ingress noise at ports 211. Accordingly, the MoCA-passing filter 225 passes the MoCA signals 251 to the MoCA ports 211 and blocks both the downstream CATV signal 22 and the upstream CATV signal 40 from being communicated to the MoCA ports 211. By doing so, the MoCA-passing filter 225 can create a substantially MoCA-only network 249 among the subscriber equipment 247.

Thus, noise originating in the MoCA-only network 249 having frequencies outside those of the MoCA signals 251 may be blocked from entering the CATV network 20 by the MoCA-passing filter 225. Further, noise originating in the MoCA-only network 249 having frequencies within those of the MoCA signals 251 are blocked from entering the CATV network 20 by the MoCA-blocking POE filter 215, after being attenuated by the signal combination device 223 (e.g., by proceeding from the second leg terminal 259B to the first leg terminal 259A).

Additionally, the MoCA-passing filter 225 facilitates network migration to "full duplex" communication. Briefly, some cable providers may include a "full duplex" frequency band. This may modify the traditional up/downstream cable plans, as, for example, the 5 MHz-600 MHz spectrum can become bidirectional. In such bidirectional communication, within this frequency spectrum, a full duplex pathway is provided, allowing transmission of either forward or return signals in the frequency band. As full duplex devices in the home may generate high power signals in the 5 MHz-600 MHz frequency range, the MoCA-pas sing filter 225 prevents devices connected in the MoCA network 249 from receiving these high power signals which may interrupt communications by potentially overwhelming the RF detectors of MoCA devices in network 249.

In some embodiments, the MoCA splitter 229 can be configured to pass signals in in the frequency range of the MoCA signal 251, including frequencies of the downstream CATV signal 22, the upstream CATV signal 40, and the MoCA signals 251, so as minimize attenuation of the MoCA signals 251 in comparison to signals outside the MoCA frequency band. For example, the MoCA signals 251 passing between the leg terminals 265A may be attenuated by less than about 30 decibels, less than about 25 decibels, or less than about 22 decibels within the scope of the term "without substantial attenuation."

The signal combination device 223 may be configured to attenuate downstream CATV signals 22 passing from the MoCA-blocking filter 215 toward the MoCA-passing filter 225. For example, the first broadband splitter 219 may receive the downstream CATV signals 22 at the first leg terminal 259A. At least a portion of the downstream CATV signals 22 may proceed therefrom to the common terminal 259C. At least another portion of the downstream CATV signals 22 may proceed from the first leg terminal 259A to the second leg terminal 259B, but the first broadband splitter 219 may be configured to substantially attenuate such signals. For example, the first broadband splitter 219 may be configured to reduce a signal strength of the signals passing between the first and second leg terminals 259A, 259B by at least about 30 decibels, at least about 35 decibels, or at least about 40 decibels within the scope of the term "substantially attenuate".

Similarly, the MoCA signals 251, or any reflected CATV signals from the MoCA-passing filter 225, that reach the second leg terminal 259B may be substantially attenuated (e.g., at least about 40 decibels reduction in strength) from reaching the first leg terminal 259A, thereby reducing the MoCA signals 251 (and/or reflected CATV signals) that reach the MoCA-blocking filter 215. By contrast, the first splitter 219 may pass the downstream CATV signals 22 from the first leg terminal 259A to the common terminal 259A, and may pass the MoCA signals 251 from the second leg terminal 259B to the common terminal 259C, without substantially attenuating the signals 22, 251. The second broadband splitter 221 may operate similarly, attenuating signals from transmitting between the first and second leg terminals 263A, 263B.

Furthermore, the splitters 219, 221 may accomplish the signal attenuation, transmission, and combination functions described herein without the use of a frequency-based filter, but rather through use of directional couplers or other direction-sensitive components as will be apparent to one of skill in the art. Moreover, in some embodiments, the signal combination device 223 may be passive, i.e., not include any powered signal conditioning components. Indeed, in some embodiments, the entire entry adapter 10 may be passive, likewise including no powered signal conditioning components, and thus receiving no external power except what is provided by the CATV signals 22, 41 and the MoCA signals 251.

The following tables provide two examples of levels of attenuation for signal transmission between the various ports. It will be appreciated that all values indicated are estimates, e.g., a specification of X value means "about X". In this context, "about" means within a reasonable tolerance.

TABLE 1

Specifications for a first example passive MoCA entry device

| | | |
|---|---|---|
| Bandwidth | Input 203 to Access Ports 207A/B | 54-1002 MHz |
| | MoCA port 211 to MoCA port 211 | 1125-1675 MHz |
| Insertion Loss | Input 203 to any MoCA port 211 | at least 40 decibels |
| | Input 203 to any access port 207A/B | at most 8 decibels |
| Isolation | Access port 207A/B to Access port 207A/B | at least 25 decibels (5-10 MHz) at least 35 decibels (11-85 MHz) at least 25 decibels (86-1125 MHz) at most 25 decibels (1125-1675 MHz) |
| | Access port 207A/B to MoCA port 211 | at most 31 decibels (1125-1675 MHz) |
| | MoCA port 211 to MoCa port 211 | at most 22 decibels (1125-1675 MHz) |

TABLE 2

Specifications for a second example passive MoCA entry device

| | | |
|---|---|---|
| Bandwidth | Input 203 to Access Ports 207A/B | 54-1002 MHz |
| | MoCA port 211 to MoCA port 211 | 1125-1675 MHz |
| Insertion Loss | Input 203 to any MoCA port 211 | at least 40 decibels |
| | Input 203 to any access port 207A/B | at most 8 decibels |
| Isolation | Access port 207A/B to Access port 207A/B | at least 25 decibels (5-10 MHz) at least 35 decibels (11-85 MHz) at least 25 decibels (86-1125 MHz) at most 25 decibels (1125-1675 MHz) |
| | Access port 207A/B to MoCA port 211 | at most 28 decibels (1125-1675 MHz) |
| | MoCA port 211 to MoCa port 211 | at most 16 decibels (1125-1675 MHz) |

Figure 3:
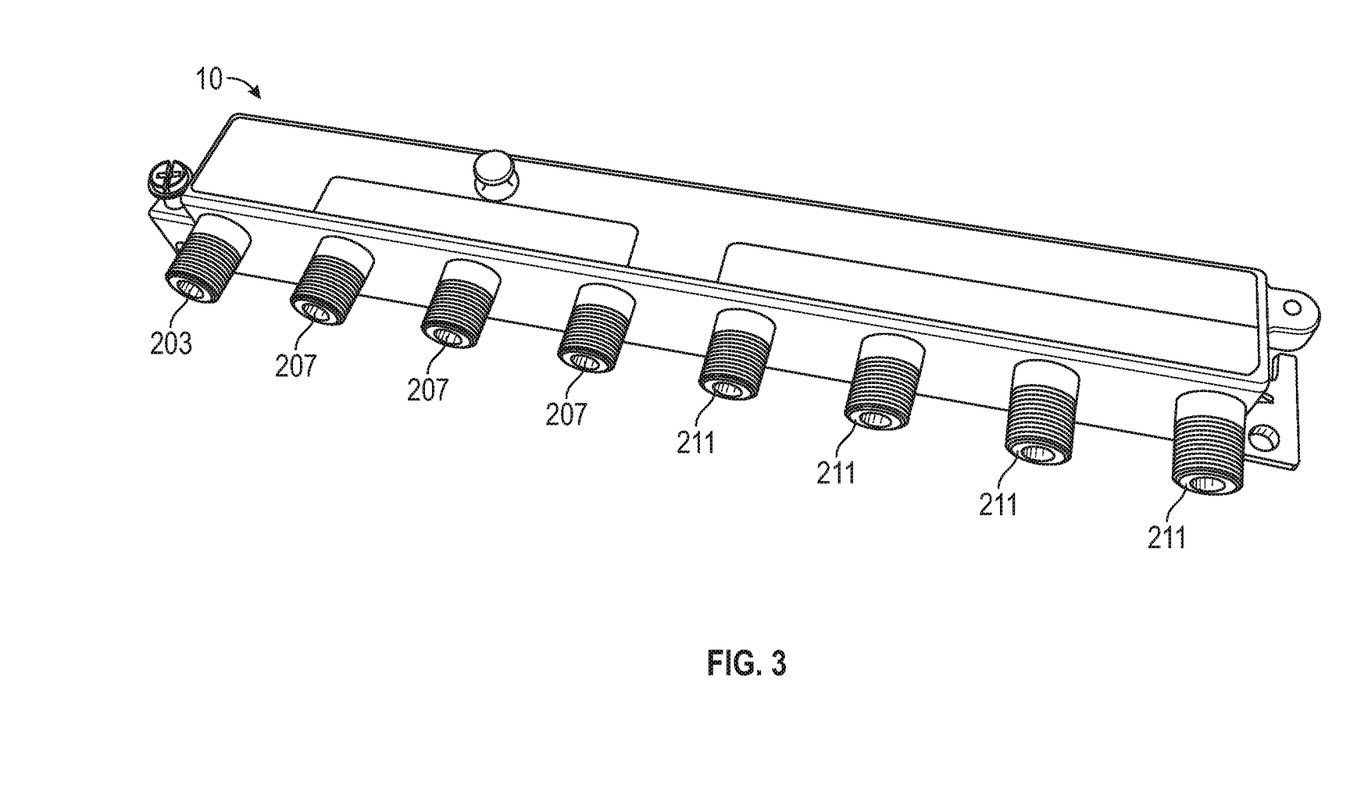
FIG. 3 shows an example of an entry adapter, in accordance with aspects of the present disclosure.
Figure 4:
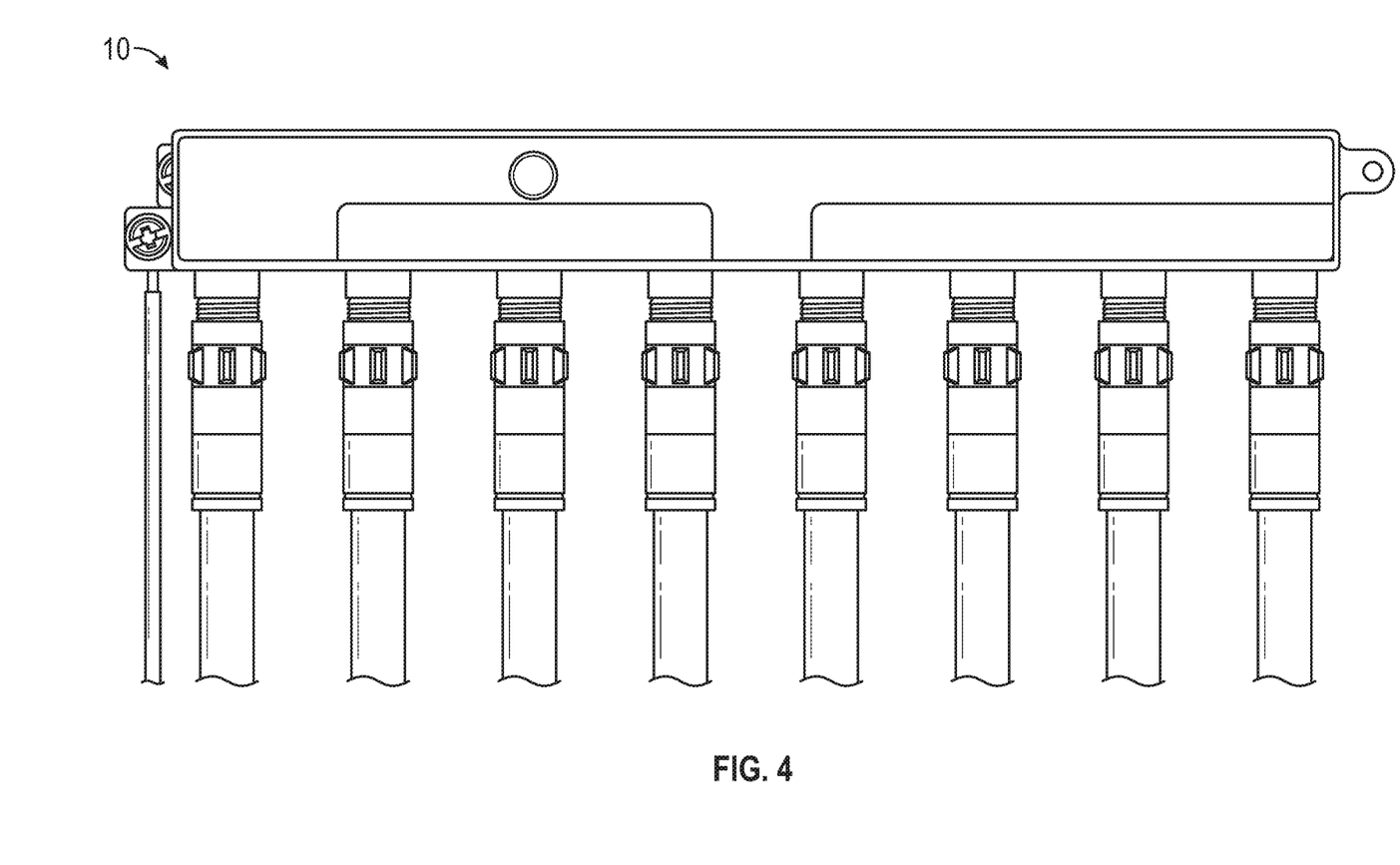
FIG. 4 shows an example of an entry adapter, in accordance with aspects of the present disclosure.

FIGS. 3 and 4 show an example of an entry adapter 10, in accordance with some embodiments consistent with the present disclosure. The entry adapter 10, including input port 203, access ports 207, and MoCA ports 211, can be the same or similar to that previously disclosed herein.

Figure 5:
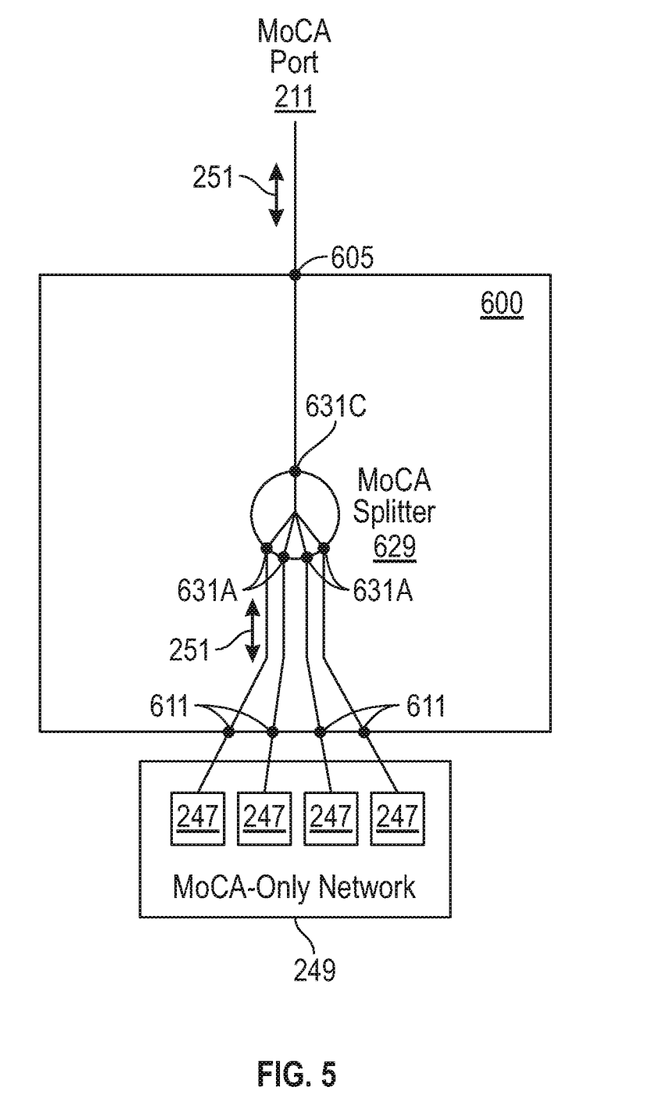
FIG. 5 shows an example of a MoCA extender, in accordance with aspects of the present disclosure.

FIG. 5 shows a functional block diagram of an example of a MoCA extender 600, in accordance with aspects of the present disclosure. The MoCA extender 600 can include an input port 605, MoCA ports 611, and a MoCA splitter 629, all of which may be the same or similar to those previously described herein (e.g., input port 203, MoCA ports 211, and MoCA splitter 229). The MoCA extender 600 can send and receive MoCA signals 251 from, for example, a MoCA port 211 via the input port 605. The input port 605 can be connected to and in direct communication with a common port 631C of the MoCA splitter 629. The leg terminals 631A of the MoCA splitter 629 can be connected to and in direct communication with the MoCA ports 611. By doing so, the MoCA extender 600 can extend the MoCA-only network 249 among a greater number of the subscriber equipment 247 than the entry.

Figure 6:
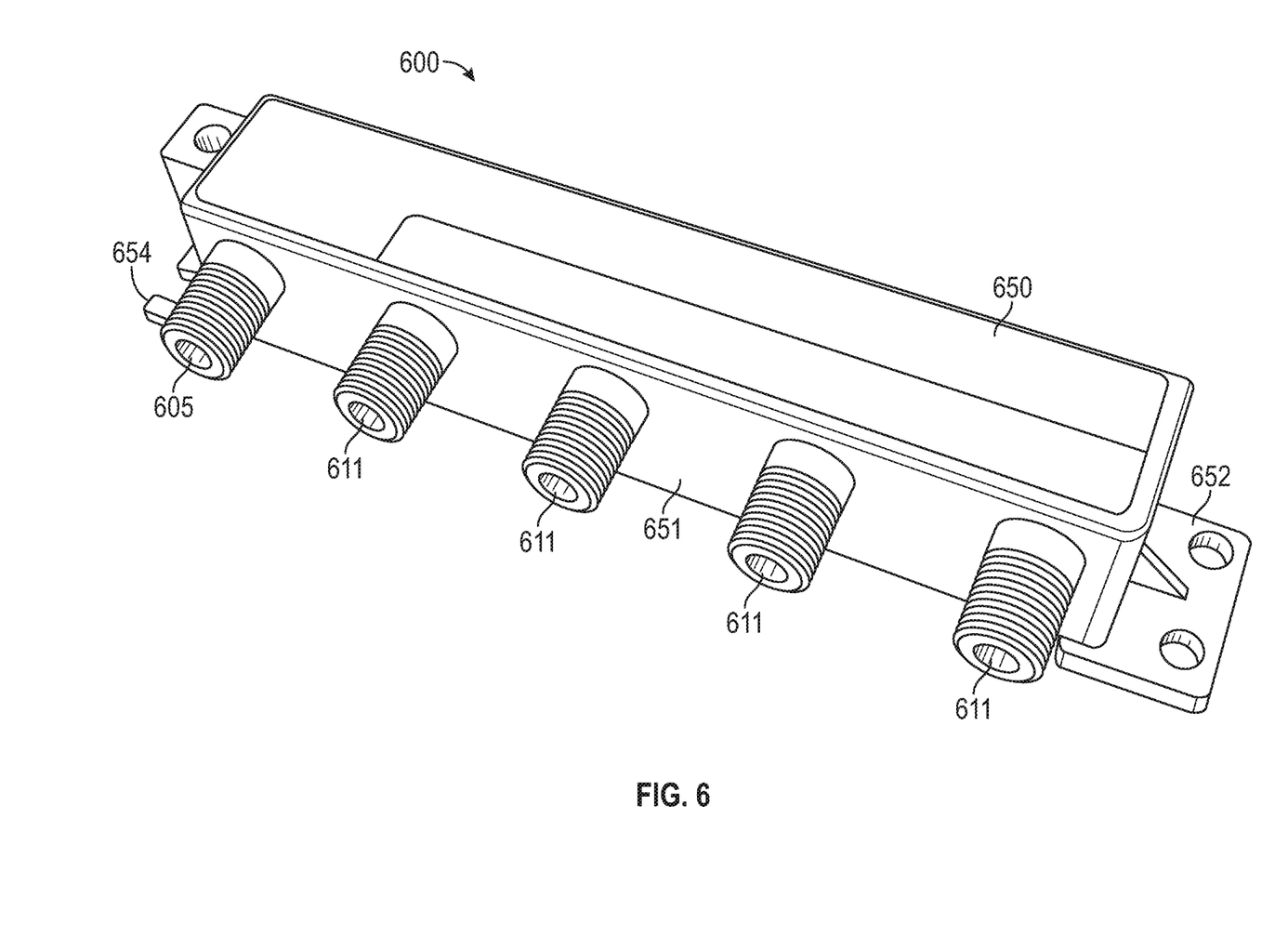
FIG. 6 shows an example of a MoCA extender, in accordance with aspects of the present disclosure.

FIG. 6 shows a perspective view of an example of a MoCA extender 600, in accordance with aspects of the present disclosure. As shown, the MoCA extender 600 generally includes a housing 650. The MoCA ports 611 and the input port 605 may extend through the housing 650, and may be threaded or otherwise configured to connect to coaxial cables (or any other type of cable). Further, the input port 605 and the MoCA ports 611 may each extend from the same side 651 of the housing 650, but in other embodiments, may extend from any of the various sides of the housing 650.

Figure 7:
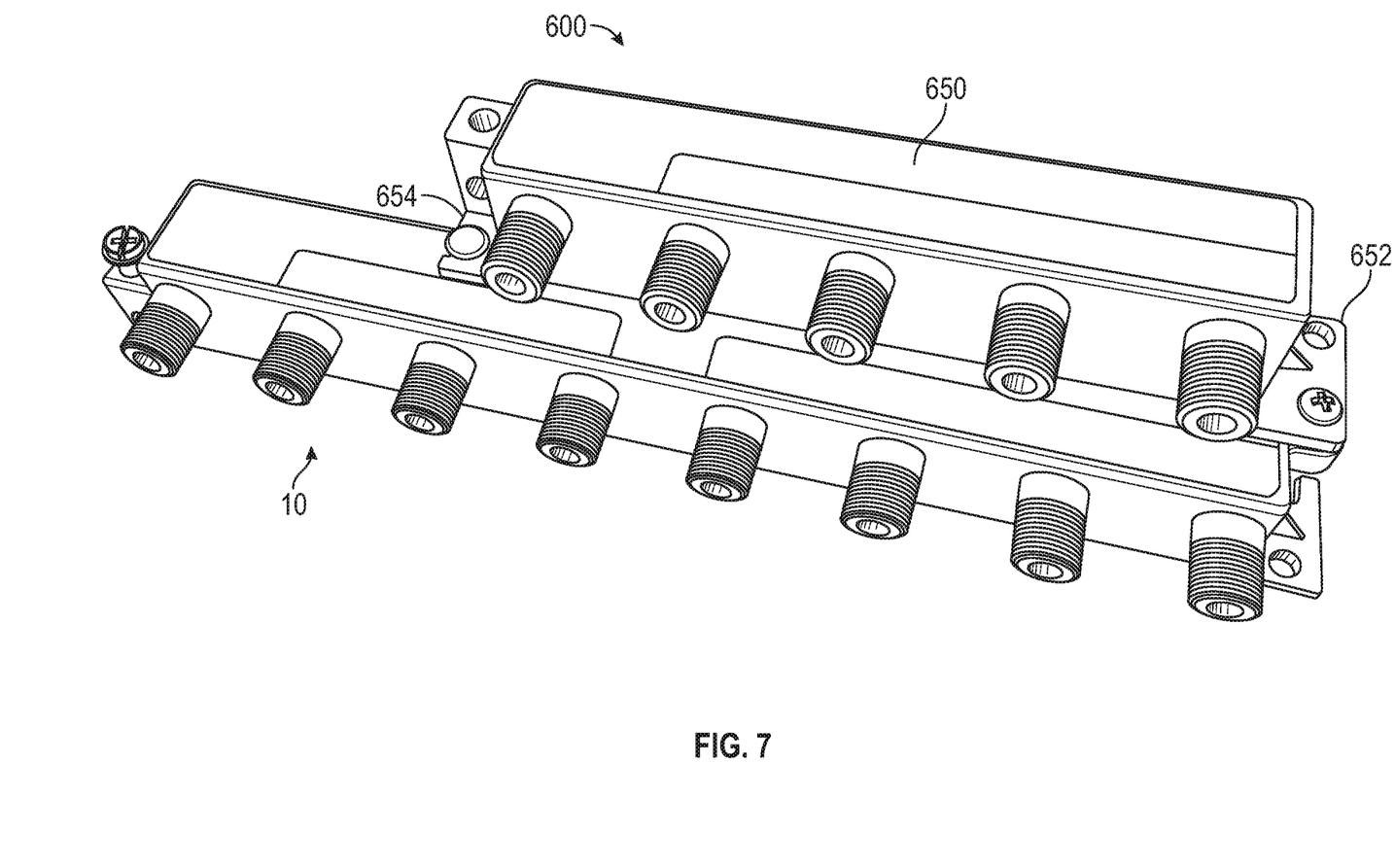
FIG. 7 shows an example of the MoCA extender stacked on top of an entry adapter, in accordance with aspects of the present invention.

Further, the MoCA extender 600 may include a pair of flanges 652, 654, e.g., on opposite ends of the housing 650. As shown in FIG. 7, the flanges 652, 654 may be configured to receive fasteners or otherwise couple the housing 650 to a housing 700 of the entry adapter 10.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. An entry adapter for receiving cable-television (CATV) signals from a CATV network, providing the CATV signals to one or more network devices and a Multi-Media over Coaxial Alliance (MoCA) server, and communicating MoCA signals between the MoCA server and one or more MoCA devices, the entry adapter comprising:
   an input port configured to be connected to the CATV network;
   a MoCA-blocking filter electrically connected to the input port and configured to block MoCA signals from transmitting to the input port;
   a signal combination device in electrical communication with the input port via the MoCA-blocking filter, the signal combination device comprising:
      a first splitter having a first leg terminal electrically connected to the MoCA-blocking filter, a second leg terminal, and a common terminal, wherein the first splitter is configured to attenuate signals from passing between the first and second leg terminals by at least 40 decibels, and wherein the first splitter is configured to combine downstream CATV signals received at the first leg terminal with MoCA signals received at the second leg terminal, and provide a broadband signal comprising the downstream CATV signals received at the first leg terminal and the MoCA signals received at the second leg terminal to the common terminal,
      wherein the first splitter comprises one or more direction-sensitive components configured to block the MoCA signals and the downstream CATV signals from passing between the first and second leg terminals, permit the MoCA signals, the downstream CATV signals, and upstream CATV signals to pass between the common terminal and the first leg terminal, and permit the MoCA and upstream CATV signals to pass between the common terminal and the second leg terminal, wherein the one or more direction-sensitive components are configured to permit or block signal transmission therethrough depending on whether the signal is proceeding between the first or second leg terminal and the common terminal, or between the first and second leg terminals, and not based on a frequency of the signal; and a second splitter having a common terminal electrically connected to the common terminal of the first splitter, a first leg terminal, and a second leg terminal, wherein the second splitter is configured to provide copies of the broadband signal received at the common terminal thereof to the first and second leg terminals thereof;

a MoCA-passing filter electrically connected to the second leg terminal of the first splitter, wherein the MoCA-pas sing filter is configured to block CATV signals from proceeding therethrough;

a first access port electrically connected the first leg terminal of the second splitter, and configured to be connected to the MoCA server;

a second access port electrically connected to the second leg terminal of the second splitter, and configured to be connected to the one or more network devices;

a plurality of MoCA ports configured to be connected to the one or more MoCA devices; and a MoCA splitter having a common terminal electrically connected to the MoCA-passing filter and a plurality of leg terminals, wherein the MoCA ports are electrically connected to the plurality of leg terminals, wherein the MoCA splitter is configured to communicate MoCA signals between the plurality of MoCA ports without substantially attenuating the MoCA signals, to communicate MoCA signals from the plurality of leg terminals to the MoCA-pas sing filter, and from the MoCA-passing filter to the plurality of leg terminals, and wherein the MoCA-blocking filter is configured to reflect the MoCA signals towards the MoCA server so as to reduce attenuation in the MoCA signals that proceed from one of the plurality of MoCA ports to the first access port.

2. The entry adapter of claim 1, wherein the MoCA signals have a frequency of between 1125 MHz and 1675 MHz, and wherein the CATV signals have a frequency of between 5 MHz and 1002 MHz.

3. An entry adapter for a cable television (CATV) network, comprising:
an input port configured to receive downstream CATV signals from the CATV network and to communicate upstream CATV signals to the CATV network;
a signal combination device having a first leg terminal configured to receive the downstream CATV signals from the input port, a second leg terminal, and a common terminal, wherein the signal combination device is configured to attenuate signals passing between the first and second leg terminals;
a first access port configured to receive the downstream CATV signals from the common terminal of the signal combination device, to communicate upstream CATV signals to the common terminal, and to communicate Multi-Media over Coaxial Alliance (MoCA) signals to the common terminal; and one or more MoCA ports electrically connected to the second leg terminal of the signal combination device, the one or more MoCA ports being configured to send MoCA signals to the first access port via the signal combination device, and to receive MoCA signal from the first access port via the signal combination device,
wherein the signal combination device comprises one or more direction-sensitive components configured to permit or block transmission of the upstream CATV signals, the downstream CATV signals, and the MoCA signals therethrough depending on whether the upstream CATV signals, the downstream CATV signals, and the MoCA signals are proceeding between the first or second leg terminal and the common terminal, or between the first and second leg terminals.

4. The entry adapter of claim 3, wherein the signal combination device comprises a first splitter having the common terminal, first leg terminal, and second leg terminal.

5. The entry adapter of claim 4, wherein the first splitter is configured to attenuate the downstream CATV signals communicated from the first leg terminal to the second leg terminal by at least 40 decibels.

6. The entry adapter of claim 4, wherein the signal combination device further comprises a second splitter having a common terminal electrically connected to the common terminal of the first splitter, a first leg terminal electrically connected to the first access port, and a second leg terminal electrically connected to one or more second access ports.

7. The entry adapter of claim 3, wherein the one or more direction-sensitive components comprise a directional coupler, and wherein the signal combination device does not include a frequency-based filter between the first and second leg terminals.

8. The entry adapter of claim 3, further comprising a MoCA-blocking filter electrically connected to the input port and the first leg terminal of the signal combination device and interposed therebetween, wherein the MoCA-blocking filter is configured to block MoCA signals from reaching the input port from the first access port, and to block MoCA signals from reaching the input port from the one or more MoCA ports.

9. The entry adapter of claim 8, wherein the MoCA-blocking filter is configured to reflect MoCA signals toward the first access port.

10. The entry adapter of claim 8, further comprising a MoCA extender comprising:
an extender input port electrically connected to one of the one or more MoCA ports;
a second MoCA splitter electrically connected to the extender input port; and
a plurality of second MoCA ports electrically connected to the second MoCA splitter, wherein each of the plurality of second MoCA ports are configured to be connected to a MoCA device.

11. The entry adapter of claim 10, further comprising an entry adapter housing at least partially containing the input port, the signal combination device, the first access port, and the one or more MoCA ports, wherein the MoCA extender further includes an extender housing at least partially containing the extender input port, the second MoCA splitter, and the plurality of second MoCA ports, the extender housing being connectable to the entry adapter housing, and wherein the MoCA-blocking filter is positioned external to the entry adapter housing.

12. The entry adapter of claim 3, further comprising a MoCA splitter having a common terminal electrically connected to the second leg terminal of the signal combination device, a first leg terminal electrically connected to one of the one or more MoCA ports, and a second leg terminal electrically connected to another one of the one or more MoCA ports, wherein the one or more MoCA ports are electrically connected to the second leg terminal of the signal combination device via the MoCA splitter.

13. The entry adapter of claim 12, wherein the MoCA splitter is configured to transmit MoCA signals between the first and second leg terminals without substantial attenuation.

14. The entry adapter of claim 13, wherein the MoCA splitter is configured to attenuate the MoCA signals between the first and second leg terminals by at most 22 decibels.

15. The entry adapter of claim 3, wherein the MoCA signals have a frequency of between 1125 MHz and 1675 MHz, and wherein the CATV signals have a frequency of between 5 MHz and 1002 MHz.

16. The entry adapter of claim 3, further comprising a MoCA-pas sing filter electrically connected to the second leg terminal of the signal combination device and the one or more MoCA ports, wherein the MoCA-passing filter is configured to block CATV signals from passing from the signal combination device to the MoCA ports, and to allow MoCA signals to pass substantially unattenuated therethrough.

17. An entry adapter, comprising:
an input port configured to communicate cable television (CATV) signals with a CATV network;
one or more access ports configured to communicate the CATV signals to one or more network devices and to communicate Multi-Media over Coaxial Alliance (MoCA) signals with a MoCA server;
one or more MoCA ports configured to communicate the MoCA signals with a MoCA device; and
a signal combination device comprising a first leg terminal in electrical communication with the input port, a common terminal in electrical communication with the one or more access ports, and a second leg terminal in electrical communication with the one or more MoCA ports,
wherein the signal combination device is configured to receive the CATV signals from the input port, to direct the CATV signals toward the one or more access ports without substantial attenuation, to substantially attenuate the CATV signals directed toward the one or more MoCA ports, to pass the MoCA signals from the one or more MoCA ports to the one or more access ports, and to pass the MoCA signals from the one or more access ports to the one or more MoCA ports,
wherein the signal combination device comprises one or more direction-sensitive components configured to permit or block transmission of the CATV signals and MoCA signals therethrough depending on whether the CATV signals and the MoCA signals are proceeding between the first or second leg terminal and the common terminal, or between the first and second leg terminals.

18. The entry adapter of claim 17, wherein the signal combination device comprises a first splitter having the common terminal, the first leg, and the second leg terminal.

19. The entry adapter of claim 18, wherein the first splitter is configured to attenuate signals passing between the first and second leg terminals without using a frequency-based filter.

20. The entry adapter of claim 19, wherein the first splitter is configured to attenuate signals passing between the first and second leg terminals by at least 40 decibels.

21. The entry adapter of claim 18, wherein the signal combination device further comprises a second splitter having a common terminal that is electrically connected to the common terminal of the first splitter, a first leg terminal that is electrically connected to first access port of the one or more access ports, and a second leg terminal that is electrically connected to one or more second access ports of the one or more access ports.

22. The entry adapter of claim 17, further comprising a MoCA-passing filter electrically connected to the one or more MoCA ports and to the signal combination device, wherein the MoCA-pas sing filter is configured to block the CATV signals from passing to the one or more MoCA ports, and to allow the MoCA signals to pass therethrough without substantial attenuation.

23. The entry adapter of claim 17, further comprising a MoCA-blocking filter electrically connected to the input port and the signal combination device, wherein the MoCA-blocking filter is configured to block the MoCA signals from reaching the CATV network, and to reflect the MoCA signals toward the one or more access ports.

24. The entry adapter of claim 17, wherein the one or more direction-sensitive components comprise a directional coupler.

25. An entry adapter, comprising:
an input port configured to communicate cable television (CATV) signals with a CATV network;
one or more access ports configured to communicate the CATV signals with one or more network devices and to communicate Multi-Media over Coaxial Alliance (MoCA) signals with a MoCA server;
one or more MoCA ports configured to communicate the MoCA signals with a MoCA device; and
means for attenuating and combining signals comprising a common terminal electrically connected to the one or more access ports, a first leg terminal electrically connected to the input port, and a second leg terminal electrically connected to the one or more MoCA ports, wherein the means for attenuating and combining blocks the CATV signals and the MoCA signals from passing in a first direction between the first leg terminal and the second leg terminal, and permits CATV and MoCA signals to pass in a second direction between the common terminal to the first leg terminal or between the common terminal and the second leg terminal or both, the means for attenuating and combining blocking or permitting signals depending on whether the signals are proceeding in the first or second direction.

26. The entry adapter of claim 25, further comprising means for frequency-band blocking MoCA signals passed from the common terminal to the first leg terminal by the means for attenuating and combining, but not to block CATV signals from passing bidirectionally therethrough.

27. The entry adapter of claim 26, wherein the means for frequency-band blocking the MoCA signals are positioned upstream of the input port, such that the means for frequency-band blocking the MoCA signals communicate with the means for attenuating and combining via the input port.

28. The entry adapter of claim 26, further comprising means for frequency-band blocking CATV signals, the means for frequency-band blocking being positioned between the means for attenuating and combining and the one or more MoCA ports.

29. The entry adapter of claim 25, wherein the means for attenuating and combining block the CATV signals and MoCA signals from passing from the first leg terminal to the second leg terminal in response to the CATV signals and MoCA signals arriving at the first leg terminal, and not based on a frequency of the MoCA signals or the CATV signals.

30. The entry adapter of claim 25, wherein the means for attenuating and combining block or permit the CATV signals and MoCA signals without using a frequency-based filter.

31. The entry adapter of claim 25, wherein the means for attenuating and combining provides lower-power copies of MoCA signals and CATV signals received at the common terminal to the first leg terminal and the second leg terminal.

32. The entry adapter of claim 25, wherein the means for attenuating and combining combines signals received at the first and second leg terminals to provide a combined signal at the common terminal.

33. An entry adapter, comprising:
an input port configured to communicate cable television (CATV) signals with a CATV network;
one or more access ports configured to communicate the CATV signals to one or more network devices and to communicate Multi-Media over Coaxial Alliance (MoCA) signals with a MoCA server;
one or more MoCA ports configured to communicate the MoCA signals with a MoCA device; and
a first directional coupler having a first leg terminal in electrical communication with the input port and configured to receive downstream CATV signals therefrom, a second leg terminal in electrical communication with the one or more access ports and configured to receive the MoCA signals therefrom, and a common terminal in electrical communication with the one or more access ports and configured to receive upstream CATV signals and the MoCA signals therefrom,
wherein the first directional coupler is configured to attenuate the downstream CATV signals from passing from the first leg terminal to the second leg terminal, attenuate the MoCA signals from passing from the second leg terminal to the first leg terminal, permit downstream CATV signals to pass from the first leg terminal to the common terminal, and permit upstream MoCA signals to pass between the common terminal and the first and second leg terminals, and
wherein the first directional coupler is configured to attenuate the downstream CATV signals and the MoCA signals in response to the downstream CATV signals and the MoCA signals being directed between the first and second leg terminals, and to permit the downstream CATV and MoCA signals in response to the downstream CATV and MoCA signals being directed between the common terminal and the first or second leg terminals.

34. The entry adapter of claim 33, further comprising a second directional coupler having a first leg terminal coupled to a first one of the one or more access ports, a second leg terminal coupled to a second one of the one or more access ports, and a common terminal coupled to the common terminal of the first directional coupler.

35. The entry adapter of claim 33, wherein the first directional coupler does not attenuate or permit signals in response to a frequency of the signals.

* * * * *